(12) United States Patent
Gompertz (10) Patent No.: US 12,488,774 B2
(45) Date of Patent: Dec. 2, 2025

(54) ULTRASOUND APPARATUS

(71) Applicants: Nicholas Roy Gompertz, Rutland (GB); Earswitch Ltd., Rutland (GB)

(72) Inventor: Nicholas Roy Gompertz, Rutland (GB)

(73) Assignee: Earswitch Ltd. (GB)

( * ) Notice: Subject to any disclaimer, the term of this patent is extended or adjusted under 35 U.S.C. 154(b) by 290 days.

(21) Appl. No.: 18/277,850

(22) PCT Filed: Feb. 21, 2022

(86) PCT No.: PCT/GB2022/050460
§ 371 (c)(1),
(2) Date: Aug. 18, 2023

(87) PCT Pub. No.: WO2022/175682
PCT Pub. Date: Aug. 25, 2022

(65) Prior Publication Data
US 2024/0127782 A1    Apr. 18, 2024

(30) Foreign Application Priority Data

Feb. 21, 2021  (GB) ...................................... 2102418

(51) Int. Cl.
  *G10K 11/175*    (2006.01)
  *B01D 49/00*     (2006.01)
  *G10K 11/26*     (2006.01)

(52) U.S. Cl.
  CPC ........ *G10K 11/1752* (2020.05); *B01D 49/006* (2013.01); *G10K 11/26* (2013.01)

(58) Field of Classification Search
  CPC ... G10K 11/1752; G10K 11/26; B01D 49/006
  USPC ....................................................... 381/73.1
  See application file for complete search history.

(56) References Cited

FOREIGN PATENT DOCUMENTS

| DE | 102017210729 A1 | 12/2018 | |
|---|---|---|---|
| EP | 2232483 B1 * | 2/2012 | ........... G10K 11/175 |
| KR | 20030029013 A | 4/2003 | |
| KR | 20120015122 A | 2/2012 | |

OTHER PUBLICATIONS

International Search Report and Written Opinion for International Application No. PCT/GB2022/050460, dated Jun. 3, 2022, 10 pages.

* cited by examiner

*Primary Examiner* — David L Ton
(74) *Attorney, Agent, or Firm* — Buchanan Ingersoll & Rooney PC

(57) ABSTRACT

An apparatus for creating a segregated volume of air, the apparatus including a plurality of ultrasound emitters configured to provide interfering ultrasound outputs at a location remote from the ultrasound emitters. The interfering ultrasound outputs are configured to create a region of modified air pressure of predetermined size, shape and distance from the ultrasound emitters which acts as an air-pressure barrier capable of: affecting transmission of sound across the air-pressure barrier; and/or affecting movement of air, an airborne object, airborne particles or molecules, or an object responsive to movement by air, across the air-pressure barrier; and creating, at a first boundary of the air-pressure barrier, a first volume of air and, at a second boundary of the air-pressure barrier, a second volume of air at least partially segregated from the first volume of air.

25 Claims, 6 Drawing Sheets

ULTRASOUND APPARATUS

CROSS REFERENCE TO RELATED APPLICATIONS

This application is the U.S. National Phase Application of PCT International Application No. PCT/GB2022/050460, filed Feb. 21, 2022, which claims priority to Great Britain Patent Application No. GB 2102418.7, filed Feb. 21, 2021, the contents of such applications being incorporated by reference herein.

FIELD OF THE INVENTION

The present invention relates to ultrasound apparatus. In particular, the present invention relates to an apparatus for creating a segregated volume of air using ultrasound, and an associated method.

BACKGROUND OF THE INVENTION

The ability to reduce the amplitude of sound reaching an ear is of well recognised benefit. For instance, such applications for this technology are at least in the fields of: hearing protection; hearing aids or assistive hearing devices; sound reproduction in earphones; and general reduction in noise pollution from environmental sounds relating to the home, garden, leisure activities, and work. A further application is improving privacy in noisy environments.

Some prior art does exist, but each has its own disadvantages or drawbacks.

Physical barriers to sound include wearable items such as earplugs, ear-protectors, or ear-muffs but these have the main disadvantage of reducing the wearer's situational awareness—for example being unable to hear a warning alarm—and often reduce the wearer's ability to communicate effectively. However, such physical barriers do protect the wearer from near enough all loud noises irrespective of the origin, direction or movement.

Other physical barriers include non-wearable items such as environmental barriers or absorbers/physical baffles which may include placing walls or panels between workers in open-plan offices, and/or may include use of sound absorbing and/or deflecting surfaces that shield individuals from the sounds of others or other environmental sounds. In each case, the amplitude of exposure to noise is reduced but not eliminated and such non-wearable items are generally immovable, or not easily moved, and only protect if the exposed individual is within a shielded region provided by the physical location of such barriers or absorbers. Obviously, these are of no benefit for mobile sound hazards, such as gardening machinery.

Noise cancelling sound barriers are known in the art and utilise a receiver which detects an incoming sound wave, processes this and emits a similar sound wave with a shifted phase to cancel the incoming sound wave and, thereby, reduce the user's exposure to the incoming sound wave. This is the general concept behind most noise cancellation; however, this technology does not protect against a sudden unpredictable sound, and the barriers are generally in a fixed position and in one plane between the sound source and the region to protect and, so, do not assist if a sound comes from a different direction.

Ultrasound sound barriers are also known in the art and utilise positive interference of ultrasound waves between the sound source and the region to be protected. However, again these barriers are relatively immobile or hard to move, and are limited in function by being placed in a fixed position between the sound source and the region to protect. So, they again do not assist if a sound comes from a different direction.

It is known to use localised barriers around specific sound emitters such as a noisy piece of machinery. Such localized barriers often include sound insulation to (further) reduce the sound experienced by an operator in the vicinity of the machinery. However, it is hard if not impossible to make such machinery quiet using such barriers and, even if the machinery is located in a designated room, there will still be a need for an operator to occasionally be present in that noisy environment, where he/she is still vulnerable to harmful levels of sound. As such, operators will still need to use hearing protectors as one cannot entirely reduce the sound output from various machines to levels that are safe for hearing.

None of the prior art are directed to an apparatus and method which provides a mobile/moveable sound barrier, whose operation can significantly reduce the levels of sound either: emitted from any device, machinery, process, circumstance or location; or received by a user or other person in the vicinity of the sound source. None of the prior art are directed to noise cancellation which can adapt to changing circumstances, including change in levels of the sound received at the ear.

Further, none of the prior art directly deal with reducing sound output from a laptop or other electronic device, for example during a video conference, and protecting conversations from being over-heard by others or recorded.

The present invention is aimed at providing an apparatus and method which improves sound insulation whilst reducing one or more of the disadvantages associated with the prior art.

SUMMARY OF THE INVENTION

According to a first aspect, the present invention provides an apparatus for creating a segregated volume of air, the apparatus comprising a plurality of ultrasound emitters configured to provide interfering ultrasound outputs at a location remote from the ultrasound emitters,
wherein the interfering ultrasound outputs are configured to create a region of modified air pressure of predetermined size, shape and distance from the ultrasound emitters which acts as an air-pressure barrier capable of:
  a) affecting transmission of sound across the air-pressure barrier; and/or
  b) affecting movement of air, an airborne object, airborne particles or molecules, or an object responsive to movement by ultrasound, across the air-pressure barrier; and
  c) creating, at a first boundary of the air-pressure barrier, a first volume of air and, at a second boundary of the air-pressure barrier, a second volume of air at least partially segregated from the first volume of air.

Preferably, the apparatus further comprises an ultrasound controller, for individually controlling the output of the plurality of ultrasound emitters.

Preferably, the region of modified air pressure comprises higher air pressure, lower air pressure and/or standing waves. Preferably, the first and/or second volume of air has a higher or lower pressure than the air-pressure barrier.

Preferably, creating a protected volume at the first boundary and an unprotected volume at the second boundary. Preferably, the first and second boundaries are opposed boundaries.

Preferably, the first volume or protected volume of air is localised around the plurality of ultrasound emitters.

Preferably, the protected volume is an enclosed volume bounded at least partly by the air-pressure barrier.

Preferably, the protected volume is a three-dimensional acoustic trap.

Preferably, the air-pressure barrier is a continual region of higher air pressure, lower air pressure, or standing waves.

Preferably, the air-pressure barrier is an acoustic bubble intended to encapsulate an object, person or animal, or at least a part thereof or any combination of parts.

Preferably, the interfering ultrasound outputs are configured to provide constructive interference or, alternatively, destructive interference.

Preferably, outputs of individual ultrasound emitters are:
configurable to generate patterns of constructive or destructive interference waves;
spatially arranged and focusable at a desired location of air-pressure barrier; and/or
configurable to modify characteristics of the air-pressure barrier comprising its size, depth, shape, distance from the ultrasound emitters, and/or its strength.

Preferably, outputs of individual ultrasound emitters are configurable to modify one or more characteristics of the air-pressure barrier comprising:
the transmission effect of the air-pressure barrier dependent upon the type(s) of sound one wishes to segregate using the air-pressure barrier;
the movement effect of the air-pressure barrier dependent upon the type(s) of airborne object, airborne particle(s) or molecule(s), or object responsive to movement by ultrasound, one wishes to segregate using the air-pressure barrier;
the transmission effect of the air-pressure barrier dependent upon sound detected in the first or protected volume and/or the second or un-protected volume; and/or
the transmission effect of the air-pressure barrier dependent upon an expected sound output and/or input— preferably speech, an alarm, child crying and/or doorbell.

Preferably, outputs of individual ultrasound emitters are configurable to alter the individual timing, frequency, amplitude, direction, phase or modulation characteristics of the individual ultrasound output.

Preferably, the air-pressure barrier is configured to:
prevent or reduce transmission of sound across the air-pressure barrier;
prevent or reduce movement of air, an airborne object, airborne particles or molecules, or objects responsive to movement by ultrasound, across the air-pressure barrier; and/or
provide selective audio pass-through, based upon detection of a preferred sound in one volume vis-à-vis the other volume.

Preferably, an air-pressure barrier is induced by physical alignment of the plurality of ultrasound emitters and/or varying characteristics of the ultrasound outputs of individual emitters to affect a pattern of interference at or around the desired location of the air-pressure barrier.

Preferably, one or more of the plurality of emitters is/are located in the first volume, second volume or in both first and second volumes of air, and is/are capable of providing interfering ultrasound outputs which act within one of the first or second volumes of air to interact with air, airborne particles or molecules, or object responsive to movement by air or ultrasound, to effect a movement or change in a position or state thereof within that volume.

Preferably, the movement or change in a position or state thereof comprises a rotation and/or suspension, or a sound, acoustic trap, vortex or acoustic field.

Preferably, the object responsive to movement by ultrasound is a helical screen, which is suspended and/or rotated by the effects of ultrasound. Alternatively, the airborne object is a helical screen, which is suspended and/or rotated by the effects of air movement. Further alternatively, suspension and/or rotation is provided by a combination of ultrasound and air.

Preferably, the apparatus comprises means for illuminating one or more parts of air, airborne particles or molecules, the helical screen or object responsive to movement by ultrasound at one or more predetermined locations to enable a viewer to see a three-dimensional image.

Preferably, the apparatus is configured to illuminate at one or more predetermined locations and times, and alter the one or more predetermined location(s) in a defined sequence over a period of time so as to enable said viewer to see a film, three-dimensional video or moving holographic images.

Preferably, the airborne object, airborne particles and/or airborne molecules include any objects, particles and/or molecules that are suspendable by air within one of the volumes. Further preferably, the volume may comprise a fan, blower or similar for that purpose.

According to a second aspect, the present invention provides a method for creating a segregated volume of air, the method comprising:
directing interfering ultrasound to a remote location and controlling it to create a region of modified air pressure of predetermined size and shape at that remote location which acts as an air-pressure barrier:
a) affecting transmission of sound across the air-pressure barrier; and/or
b) affecting movement of air, an airborne object, airborne particles or molecules, or objects responsive to movement by ultrasound, across the air-pressure barrier, and
creating, at a first boundary of the air-pressure barrier, a first volume of air and, at a second boundary of the air-pressure barrier, a second volume of air at least partially segregated from the first volume of air.

Preferably, the region of modified air pressure comprises higher air pressure, lower air pressure and/or standing waves. Preferably, the first and/or second volume of air has a higher or lower pressure than the air-pressure barrier. Preferably, the first and second boundaries are opposed boundaries.

Preferably, directing ultrasound without opposed ultrasound from opposed emitters or reflected ultrasound. Preferably, the segregated volume of air is unbounded by opposed ultrasound from opposed emitters or reflected ultrasound. Preferably, the segregated volume of air is within a space or region not enclosed, nor bounded on all sides, by emitted ultrasound/ultrasound emitters.

Preferably, the method comprising creating a protected volume at the first boundary and an unprotected volume at the second boundary.

Preferably, the first volume or protected volume of air is localised around a plurality of ultrasound emitters.

Preferably, the protected volume is an enclosed volume bounded at least partly by the air-pressure barrier. Preferably, the protected volume is a three-dimensional acoustic trap.

Preferably, the method comprising creating a continual region of higher air pressure, lower air pressure or standing waves, in the air-pressure barrier.

Preferably, the method comprising creating an acoustic bubble encapsulating an object, person or animal, or at least a part thereof or any combination thereof.

Preferably, the method comprising directing and/or controlling the interfering ultrasound outputs to:
- provide constructive or destructive interference;
- generate patterns of constructive or destructive interference waves;
- modify characteristics of the air-pressure barrier comprising its size, depth, shape, remote location, and/or its strength;
- modify the transmission effect of the air-pressure barrier dependent upon a type(s) of sound one wishes to segregate using the air-pressure barrier;
- modify the movement effect of the air-pressure barrier dependent upon a type(s) of airborne object, airborne particle(s) or molecule(s), or object(s) responsive to movement by ultrasound, one wishes to segregate using the air-pressure barrier;
- modify the transmission effect of the air-pressure barrier dependent upon sound detected in the first or protected volume and/or the second or un-protected volume; and/or
- modify the transmission effect of the air-pressure barrier dependent upon an expected sound output and/or input—preferably speech, an alarm, child crying and/or doorbell.

Preferably, the method comprising controlling individual ultrasound outputs to alter the individual timing, frequency, amplitude, direction, phase or modulation characteristics of the individual ultrasound output.

Preferably, the air-pressure barrier prevents or reduces transmission of sound, or prevents or reduces movement of air, airborne particles or molecules, or objects responsive to movement by ultrasound across the air-pressure barrier.

Preferably, the method further comprising selective audio pass-through, based upon detection of a preferred sound in one volume vis-à-vis the other volume.

Preferably, the method further comprising providing interfering ultrasound outputs which act within one of the first or second volumes of air to interact with air, airborne particles or molecules, or object responsive movement by air or ultrasound, to provide movement or change in a position or state thereof within that volume.

Preferably, movement or change in a position or state thereof comprises rotation and/or levitation, or a sound, acoustic trap, vortex or acoustic field.

Preferably, further comprising providing suspension and/or rotation of a helical screen. Most preferably, suspension and/or rotation is provided by ultrasound or air, or a combination thereof.

Preferably, further comprising illuminating one or more parts of air, airborne particles or molecules, the helical screen or object responsive to movement by ultrasound at one or more predetermined locations to enable a viewer to see a three-dimensional image.

Preferably, further comprising illuminating at one or more predetermined locations and times, and altering the one or more locations in a defined sequence over a period of time so as to enable said viewer to see a film, three-dimensional video or moving holographic images.

Preferably, the method utilises one more apparatus features of the first aspect.

Preferably, the method comprises suspending an object, particle and/or molecule to provide an airborne object, airborne particle and/or airborne molecule within one of the volumes. Further preferably, suspending comprises using a fan, blower or similar for that purpose.

Preferably, the method and apparatus uses ultrasound emitters to create a three-dimensional acoustic trap that acts as air-pressure barrier to alter the transmission of sound and/or other properties or materials to and/or from the three-dimensional volume of the trap—what is sometimes called an acoustic bubble.

Preferably, air-pressure barriers reduce transmission of sound by preventing emission or entry of sound, and/or other properties or materials to and/or from the three-dimensional volume.

Preferably, the invention also relates to localised ultrasound induced acoustic three-dimensional traps positioned around machinery, such as electric drills, or air-blown hand dryers, to reduce the levels of sound any individual or user in proximity is exposed to irrespective of their position in relation to the sound emitted.

Preferably, the invention includes portable and/or wearable devices or apparatus which can create an acoustic bubble. The electronics could be located on or within a glove, or wrist-worn item such as a bracelet, providing sound reduction from any device or apparatus the user may be operating by hand.

Preferably, the invention relates to location of an acoustic bubble around a single user, or users, to prevent sound being heard by other individuals outside the acoustic bubble, and/or to isolate the user and/or users from surrounding sound. This may be beneficial for many uses including in confidentiality, relaxation, sleep and/or hearing tests.

Preferably, use of an acoustic bubble or acoustic hood (used around the head and/or ears of an individual) may allow a user to be protected from an external source of sound. Further preferably, the apparatus may be mounted to a helmet or other head-worn device to protect the user from sound sources such as road noise, or engine noise from a motorcycle or otherwise. Alternatively, the apparatus may be mounted on a different form of helmet, a hat or device worn on the head, or included in or on eye-glasses (spectacles), for example in one or more arms thereof, augmented or virtual reality devices, and/or any other headset.

Alternatively, or in addition, an acoustic bubble may provide a physical limitation or barrier to movement of materials and/or substances, including but not limited to, beads such as those formed from polystyrene or other similar materials, other particles or molecules, droplets, aerosols, dust, objects, gas, medicine, drug and/or aroma. In a further alternative, any of those listed may have a physical or optical property, including any opacity/colour/optical reflectivity/acoustic reflectivity/size/density/shape/charge/mass/fluorescence or electromagnetic characteristic, or any other physical or chemical property.

Preferably, the acoustic bubble is located over all or part of the head, mouth, nose and/or face of a person who has an infectious disease—such as something viral that may be spread by aerosol and/or droplets—to reduce the spread of infected aerosol and/or droplets from the individual to surrounding air and, potentially, to other people. Similarly, the acoustic bubble may be located over a non-infected person to prevent their getting infected. In this way, the barrier acts against breathing in infected aerosols or droplets, or may prevent a wearer breathing in potentially harmful agents for example paint spray.

Preferably, an acoustic bubble may be located over all or part of the head, mouth, nose and/or face of a person using an inhaler, receiving either a dry powder drug or aerosolized drug and propellant whilst being present in a volume segregated from those around them. Preferably, this provides a more efficient delivery system because the aerosol (and the drug) remains within the acoustic bubble until it has all been inhaled, reducing wastage to the surrounding environment and isolating the drug from those who do not need it. Further preferably, the ultrasonic output may aerosolise the drug and/or maintain it in an aerosolised state within the acoustic bubble, improving drug delivery.

Preferably, the acoustic bubble provides a method of drug delivery that is effective for children and other people who are unable to tolerate current masks or plastic container delivery systems (spacers)—the acoustic bubble acting as a chamber into which a medicine may be sprayed and from where the user breathes in the medicine.

Conversely the acoustic bubble may provide a physical limitation to materials or substances or other properties of air entering within the three-dimensional space of the acoustic bubble, and this may limit movement of, for example, water (such as rain or mist), wind, moving air, or gas (including fumes or smoke). The sound bubble may be positioned forward from the face of a firefighter to eliminate smoke and hot fumes from the direct visual path of the wearer.

Preferably, the present invention provides a method for emitting ultrasound from one or more emitters located within, near and/or around an area, volume, device, machine, process, person(s), and/or animal(s). The one or more emitters may be provided as an array over a small area, for example being micro-electromechanical system (MEMs), capacitive micromachined ultrasonic transducers (CMUTs), piezoelectric micromachined ultrasonic transducers (PMUTS), polyvinylidene fluoride (PVDF) transducers, or any other ultrasound emitter or transducer. These emitters may be positioned in any direction including in a flat or curved array, in multiple arrays in similar and/or different directions and/or coverage, and/or within three-dimension arrangements of arrays.

Preferably, ultrasound signals emitted from the emitters is configured to a have one or more characteristics of frequency, amplitude, direction, phase, or modulation, or variations in those characteristics. The emitter may be one or more single emitters, emitting ultrasound output of any defined characteristic including variable and/or constant ultrasound frequency, amplitude, and/or phase. The output of each of the emitters is configured relative to the intended shape and three-dimensional volume of the acoustic bubble, the volume and/or frequency of the expected sound output or input to be limited, and/or the material and/or substance to be limited within or out of the acoustic bubble.

Preferably, emitted ultrasound waves are configured to be of characteristics, patterns and output to generate patterns of constructive interference waves affecting enhanced positive air pressure regions (or standings acoustic waves) at the boundary of the three-dimensional acoustic bubble.

Preferably, the distance from the emitters at which positive interference and positive air pressure regions are generated may be fixed, for example to be located at the boundary of a predefined three-dimensional shape. The boundary may be altered by an algorithm in response to a user's input to affect its shape, size and/or strength, and/or the position of the acoustic bubble, or the boundary may be altered following internal or external sensors detecting a sound internal or external to the bubble (respectively).

Preferably, the acoustic bubble may be generated by a device that is movable or be a fixed device within or attached to another device, such as an electric drill, hand dryer, or be positioned around the engine of a car. The device may be worn by a user. For example, as an attachment or integrated aspect of a motorcycle helmet or other protective helmet, in a wearable device such as a headphone or device worn within clothing (for example a glove) or other articles near the neck, wrist, hand or other area of the body.

Preferably, additional ultrasound interference patterns may be generated by similar or different frequencies of ultrasound or sound and be focused within the acoustic bubble to produce sounds, movement, acoustic traps, vortices and/or acoustic fields within the bubble. For example, the additional ultrasound interference may affect movement of beads, molecules, particles, gas, devices or structures (such as a helical screen) within the acoustic bubble. Preferably, these structures, particles, other substances, or molecules may be illuminated by light emitters including light emitting diode (LED) or laser emitters of any visible or non-visible light spectrum, or other electromagnetic output, which may include the generation of a visual effect such as a hologram, three-dimensional image or volumetric display image. Preferably, the movement, sound, gas pressure waves (acoustic field) within the acoustic bubble may be provided by ultrasound emitted totally or partially from the emitters that provided the ultrasound to form the boundary of the acoustic bubble, or be provided totally or partially from separate ultrasound emitters that may be positioned within or external to the acoustic bubble.

Preferably, light emitters are arranged in arrays, or singly, at one or more positions around or within the acoustic bubble. The light emitters may be controlled by an algorithm to illuminate a position in space corresponding to a point on a three-dimensional image. For instance, this may illuminate a three-dimensional structure such as a helically shaped planar film or screen which is positioned, suspended and rotated by the effects of ultrasound within the acoustic bubble. Preferably, the helical screen/structure within the acoustic bubble is caused to spin rapidly around any axis of rotation. This is shown as rotation around a vertical axis in FIG. 5 but could equally be around a horizontal axis. Preferably, the emitter of light, laser or other radiation is configured to provide illumination at one point of the helical surface of the screen when a position of the helical surface is located with a corresponding point on a three-dimensional image. Further preferably, multiple emitters of light, laser or other radiation illuminate regions of the rotating helical structure, or other structure, at a time in rotation of the structure to effect emission of colours of light at the point in space consistent with a three-dimensional image. The frequency of rotation of the helix may be greater than the frequency of effective frame rate of appreciation of the human visual system enabling a viewer to appreciate a three-dimensional image. Rapid changing of the image enables the viewer to appreciate three-dimensional video, film or other moving holographic images. Preferably, laser interference patterns emitted from a laser array from different positions around and/or within the acoustic bubble—which may be in similar, different or varying frequencies, amplitudes or phases—provide interference patterns within the acoustic bubble. These may be configured to cause light generation at a point within the acoustic bubble corresponding to a point of light on a three-dimensional image. This point of generated light may be generated on a surface of a spinning three-dimensional structure, such as the helical spinning screen mentioned above, or within a vertex of gas or a volume of particles suspended within the volume of the acoustic bubble owing to agitation of the particles by ultrasound. The point of light may be generated by constructive interference, reflectance and/or fluorescence, and/or other forms of light emittance.

Preferably, the acoustic bubble acts as a containing structure for fluorescent gas in which there may be, or may not be, currents produced by ultrasound emitters. Preferably, the point at which the light waves interfere generates fluorescence and light emitted from the gas.

Preferably, the acoustic bubble encompassing particles of any size (which may be of molecular size or larger) which are affected by the ultrasound output to become suspended within the acoustic bubble and/or to move within the acoustic bubble. Preferably, the particles that may be organic or inorganic, and may include particles having fluorescence (to include fluorophores), or have reflective properties.

Preferably, the particles may include fluorophore labelled proteins or other organic or inorganic molecules, such as macrocycles. Preferably, the particles and/or molecules have properties enabling emission of several different wavelengths of light dependent upon qualities or characteristics of the incident light, and/or the molecules may have properties enabling emission of different wavelengths of light in response to the same or similar wavelength of incident light.

Preferably, the particles or molecules are proteins or other molecules that have attached thereto several fluorophores or other fluorescent molecules of different characteristics, including different characteristics of emitted light wavelength. Preferably, the acoustic bubble contains several different types of particle or molecular subgroups that have different fluorophores or other fluorescent molecules attached thereto.

Preferably, the acoustic bubble surrounds a flame and/or combustible material and/or gas. Preferably, the acoustic bubble limits the spread of flame, combustible gas and/or particles. Preferably, the invention may act as a light source and/or heater, with a configurable appearance of a resultant flame. Preferably, the dimensions of the acoustic bubble affect a predefined shape and/or direction or a configurable shape and/or direction of a flame and/or heat source.

Alternatively, the acoustic bubble may be positioned to encompass a flame and/or combustion source restricting combustible gas within the area of combustion and enabling increased efficiency of a fuel source by reducing the emission of flammable exhaust gas.

Preferably, the algorithm generates various outputs through a single or multiple emitters or array of emitters. Preferably, with more than one emitter, the processor and algorithm are configured to generate independent output ultrasound signals from each emitter. These ultrasound outputs focus interference patterns at distances and directions from the emitters configured by the algorithm of the processor to affect constructive interference at the boundaries of the three-dimensional volume. Preferably, the ultrasound outputs may be of static or variable frequency/amplitude/phase/modulation/direction. Preferably, ultrasound output may be pulsed/continuous/variably modulated or a combination thereof. It may become active upon the detection of sound above a specified frequency and/or amplitude. Additionally the output of the ultrasound emitters may be switched off or reduced in response to detection of specific frequencies, or types or volume of sound. For instance, speech, an alarm, child crying and/or a door bell.

Preferably, an input audio device having one or more input microphones may function additionally as an assistive hearing device, and/or for transmitting ambient sound (for audio pass-through). Preferably, following an appropriate input from a microphone, the processor and/or algorithm is/are configured to transmit the detected sound into the acoustic bubble. For example, this may be achieved through modulation of the ultrasound waves or generation of sound output from speakers or earphones in the bubble.

Preferably, the ultrasound outputs are variably configured for the individual user during use according to an ultrasound signal (feedback) detected by a receiver, or ultrasound transceiver if one is used. The detected feedback signal provides an input signal to the processor and the algorithm alters the ultrasound output relative to the input feedback signal.

Preferably, the processor and/or algorithm may analyse inputs or signals that are related to, developed, altered and/or affected by artificial intelligence and/or machine learning tools. Preferably, these algorithms correlate ultrasound and/or other sound detected by any sensor(s)—including dual ultrasound sensor/emitter arrays, and/or internal or external microphones—and affect a change in the output to create altered constructive interference patterns. These algorithms may incorporate information from devices to which the invention is attached, ambient information and/or individual user's data over time to affect the output from the algorithm.

Preferably, the algorithm detects a change in sound detected by one or more microphones within or external to the acoustic bubble. The processor may generate an output dependent on the algorithm detecting such sound and affects a change in the output of the emitter(s). In response to detecting increased levels of sound within the bubble that has originated outside of the bubble, an increase in the strength/amplitude of the positive air-pressure regions at the boundaries is generated increasing the effective sound insulation within the bubble.

Preferably, the invention can detect a person, or object coming into proximity with the apparatus, as the receiver receives signals that have been modified by that person or object. These operate as safety systems to, for example, switch off an electric drill when a user's other hand comes close to the acoustic bubble.

Preferably, the ultrasound output from each of the ultrasound emitters may be configurable and programmable dependent upon an individual user and/or the device and application to which the emitters are being used. User preference may also be configured. Configurations may be static according to use or variable such as for before, during or after use.

Preferably, the invention may act as a device to affect the appearance of a user's hair, for example during daily life, social events, fashion demonstrations, films, videos and advertisements. The apparatus may be incorporated in a device worn around a user's neck (like a necklace) and emit an acoustic bubble within which there may be any configuration of acoustic field or movement. Further, the apparatus may be worn at the back of the neck and generate an acoustic bubble incorporating the hair at the back of the head. An acoustic field within the acoustic bubble may be configured to produce movement of the hair in a continuous fashion to mimic hair being blown by wind, or may be of static or variable configuration.

Advantageously, ultrasound emitters provide constructive ultrasound interference resulting in positive air pressure regions (or standing waves) that reduce transmission of sound waves, vibrations, and/or movement. This stops, reduces or dampens vibrations from ambient sound/noise providing an effect similar to passive or active noise cancellation headphones/earphones.

Advantageously, the invention provides three-dimensional sound barriers, and barriers that reduce the movement or act as resistance against movement of other materials including low density objects, gases and particles.

Advantageously, the invention reduces sound output from any device and/or source of noise. For instance, the invention provides a reduction in noise generated by: a hand dryer; automobile engine; firearm or acoustic gun (including a rapid deployed high-pressure directed acoustic bubble or wave); animal, including dog (utilising ultrasound frequencies above those detectable by the animal); and/or an electric hand tool.

Advantageously, by making the invention wrist-worn, the acoustic bubble is portable and surrounds whatever is held in the user's hand.

Advantageously, use of an acoustic bubble or acoustic hood improves the ability of earphones to augment a user's experience by reliably transmitting sound without the effect and/or interference of external and/or background noise. This allows more efficient transmission (pass-through) and/or filtering of external sounds by earphones to allow the transmission of predefined sounds such as speech and/or alarms. Further, reduced exposure to external sound facilitates more accurate hearing tests in both clinical and research situations, and reduces disturbing sounds reaching the user (for example reducing the sound of an alarm from an alarm clock which has been set to awake a users' partner earlier than is required for the user).

Advantageously, the present invention may be used in healthcare or other occupations, or in normal activities of daily living, providing an invisible barrier without the necessity to physically cover the mouth, nose and/or face with a physical mask.

Advantageously, privacy is improved for participants of video conferencing, and external sounds potentially affecting the sound quality for participants are reduced.

Advantageously, sound transmission from a drill is reduced and so too the risk of damage to hearing. This improves situational awareness and communication for the user and for surrounding people. Further, similar advantages are provided when the invention is used with other devices, such as an air-blown hand dryer.

Advantageously, the acoustic bubble reduces sound exposure of the user to external sound and this acts as a protective helmet to protect the user against loud sounds. Further advantageously, ultrasound arrays worn by users reduce external noise enabling undisturbed sleep, improve sound from earphones by reducing interference from external noise, and/or provide improved hearing tests or hearing assessments in any environment where it would assist if background noise was eliminated.

Those skilled in the art will understand the term 'responsive to movement by ultrasound' to mean an object is capable of being moved by ultrasound per se, the effect ultrasound has on a surrounding medium such as air, or a combination of both. Clearly some objects are movable but could not be prevented from movement across the air barrier. The invention, therefore, covers only those objects whose movement across the air barrier is preventable/prevented. Whilst it is not intended to be bound by theory, airborne objects, airborne particle(s) or molecule(s) and/or objects responsive to movement by ultrasound will tend to be relatively lightweight, or of relatively low density.

BRIEF DESCRIPTION OF THE DRAWINGS

The invention will now be disclosed, by way of example only, with reference to the following drawings, in which.

DETAILED DESCRIPTION OF THE PREFERRED EMBODIMENTS

The present invention is an apparatus and associated method utilising ultrasound emitters to create three-dimensional acoustic bubbles that act as air-pressure barriers to reduce the transmission of sound or movement of air, airborne particles or molecules, or objects responsive to movement by ultrasound.

Figure 1:
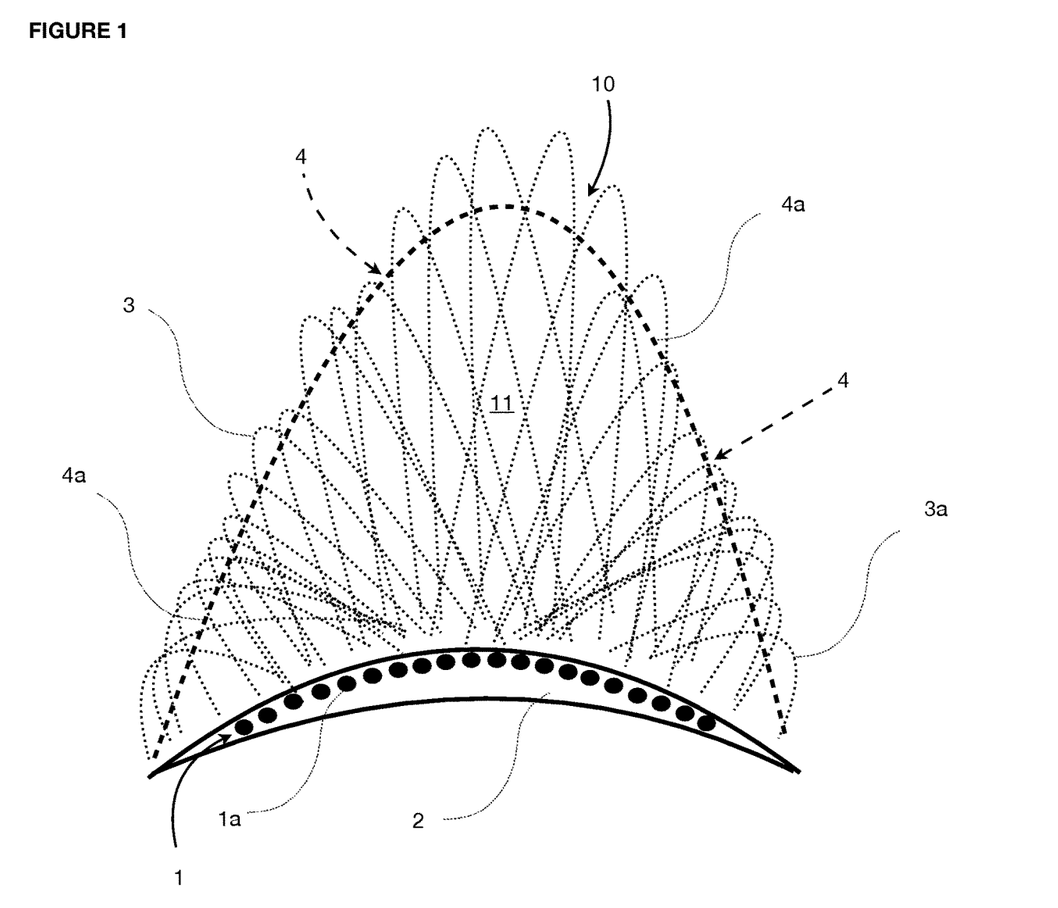
FIG. 1 is a graphical representation of a curved ultrasound array, which generates a three-dimensional sound trap (acoustic bubble)

FIG. 1 shows an array of ultrasound emitters 1, being located on or within a curved support structure 2. The array 1 includes a plurality of individual emitters 1a, each capable of providing an ultrasound output 3 away from the support structure 2. Associated electronics including at least a processor, ultrasound output controller and power source are provided—not shown directly in FIG. 1—and are at least partially located within the support structure 2.

In use, each emitter 1a is individually controlled to control its timing, and ultrasound properties such as wavelength, amplitude, frequency, modulation and/or phase, and ultrasound 3 is directed to a remote location 10 where the ultrasound outputs 3 of a number of the plurality of emitters 1a combine to create a region 4 of modified air pressure of predetermined size, shape, depth and distance from the emitters 1a, which has the effect of creating an air-pressure barrier 4a. The air-pressure barrier 4a at least partially segregates a first and second volume of air.

In this example, the ultrasound outputs 3 combine in constructive interference patterns in the region of modified air pressure 4 to create localised increased air pressure (which may also be standing waves). The properties of the ultrasound outputs 3 affect the size, shape and depth of the region 4, and also its three-dimensional location, such that barrier 4a encloses a three dimensional volume 11 (a protected volume) which may be termed a sound trap (or acoustic bubble). The barrier 4a reduces transmission of sound from outside of volume 11 (an unprotected volume) to within volume 11, and vice-versa. Further, transmission of sound from within the volume 11 of the acoustic bubble to externally thereof is attenuated and reduced in amplitude and, similarly, transmission of sound from outside the volume 11 to inside the acoustic bubble is attenuated and reduced in amplitude.

The invention can, therefore, provide a three-dimensional air-pressure barrier which provides a protected volume at one boundary and an unprotected volume at another boundary that reduces or substantially prevents sound from transmitting across the air-pressure barrier. Further, although in this example it is a reduction in sound that is exemplified, such air-pressure barriers can also reduce or substantially prevent movement of air, airborne particles or molecules, or an object responsive to movement by ultrasound, across the air-pressure barrier—effectively segregating the contents of volume 11 from outside.

Figure 2:
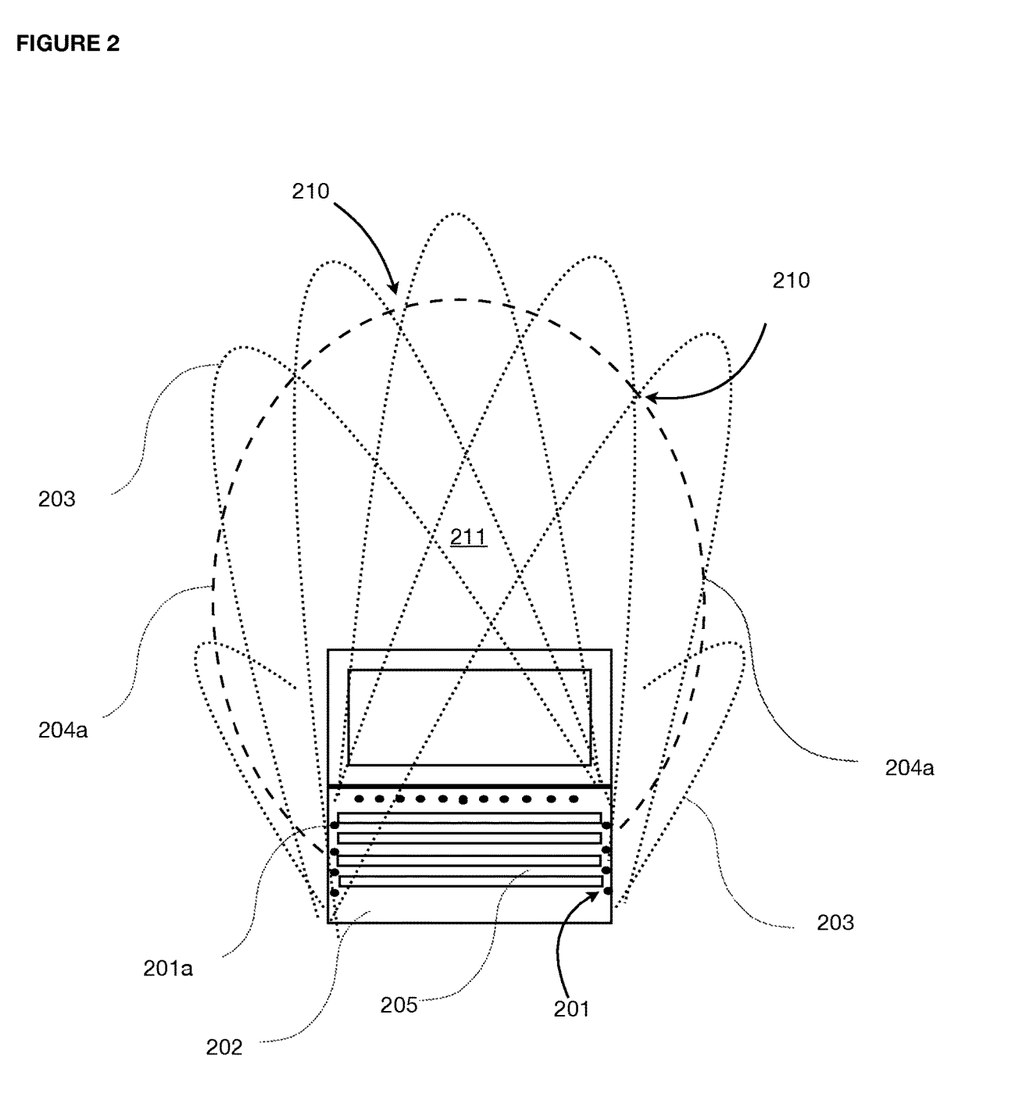
FIG. 2 is a graphical representation of a further ultrasound array located in the environs of a laptop computer, which array generates a three-dimensional sound trap around the laptop.

FIG. 2 shows an ultrasound array 201, having a plurality of individual ultrasound emitters 201a, each located on a laptop computer 202 and directed upwards therefrom when in use (as shown). The emitters 201a are located along three edges of a keyboard 205 of the laptop 202—although other arrangements of the array 201 are equally applicable. Each emitter 201a is capable of providing an ultrasound output 203 for directing ultrasound 203 upwards and away from the laptop 202 to a remote location 210. Associated electronics including at least a processor, ultrasound output controller and power source are provided—not shown directly in FIG. 2—which are either provided by the laptop 202 per se or additionally provided. The apparatus of FIG. 2 operates in a similar way to the apparatus of FIG. 1.

In use, each emitter 201a is individually controlled to control its timing, and ultrasound properties such as wavelength, amplitude, frequency, modulation and/or phase, and ultrasound 203 is directed to the remote location 210 where the ultrasound outputs 203 of a number of the plurality of emitters 201a combine to create an air-pressure barrier 204a of predetermined size, shape, depth and distance from the emitters 201a. The barrier 204a encloses a three-dimensional volume 211, which surrounds the laptop 202 and, preferably, a region beyond the environs of the laptop 202 in which a user's head would be located whilst using the laptop 202. The effect of the barrier 204a is to reduce transmission of sound from outside of volume 211—an unprotected volume—to within volume 211—a protected volume—and vice-versa. Accordingly, a user placing his/her head within the acoustic bubble created by the volume 211 is separated from whatever is going on outside the acoustic bubble such that a microphone of the laptop cannot detect external sound. Conversely, anyone located outside of the acoustic bubble cannot hear the sound content inside the bubble, making the discussion private from individuals outside. This would be a particular advantage in videoconferencing and working from home arrangements, providing improved privacy and sound quality for participants.

Although described in relation to use with a laptop, the invention may be used with other forms of communication, such telephones (landline or mobile), or other environments where having an acoustic bubble would benefit those wishing to have private conversations in open-plan offices, etc., where individuals could themselves be located within the bubble to the exclusion of those outside thereof.

Figure 3:
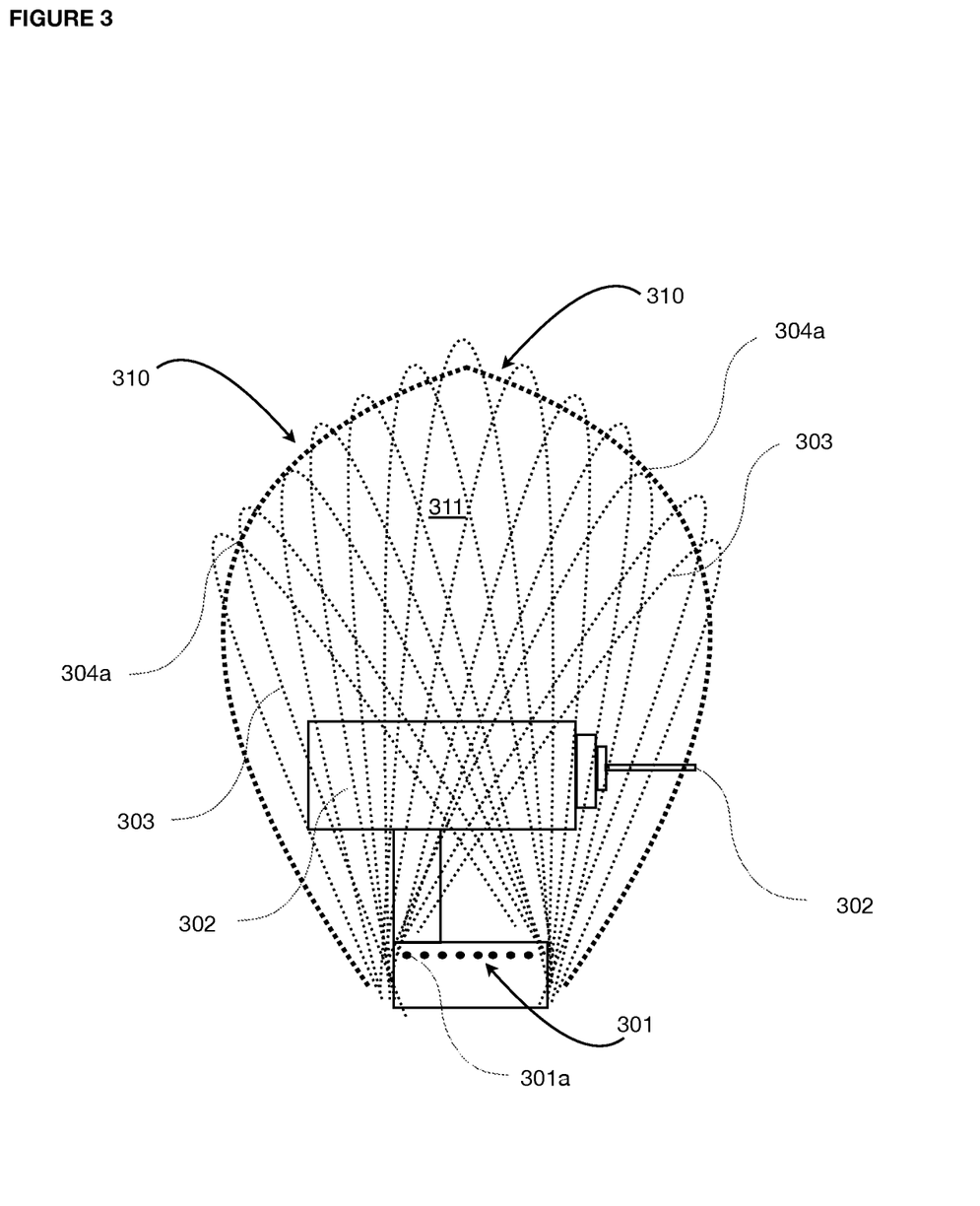
FIG. 3 is a graphical representation of further ultrasound array located in the environs of an electric drill, which array generates a three-dimensional acoustic bubble around the electric drill.

FIG. 3 shows a two or three dimensional ultrasound array 301, having a plurality of individual ultrasound emitters 301a, which are located on a part of a handheld electric drill 302. In FIG. 3 the array 301 is located upon a side of a base-part of the drill 302, with a corresponding array located on the opposite side, to direct ultrasound outwards and upwards therefrom to a remote location 310. Each emitter 301a is capable of providing an ultrasound output 303. Associated electronics including at least a processor, ultrasound output controller and power source are provided—not shown directly in FIG. 3—which are either provided by the drill 302 per se or additionally provided. Accordingly, the apparatus of FIG. 3 operates in a similar way to the apparatus of FIG. 1 or FIG. 2.

Although the ultrasound array is shown to be provided in the base of the drill, where the battery and electronics are located, this is not essential. Further, the drill may have multiple arrays located at different parts thereof.

In use, each emitter 301a is individually controlled to control its timing, and ultrasound properties such as wavelength, amplitude, frequency, modulation and/or phase, and ultrasound 303 is directed to the remote location 310 where the ultrasound outputs 303 of a number of the plurality of emitters 301a combine to create an air-pressure barrier 304a of predetermined size, shape, depth and distance from the emitters 301a. The barrier 304a encloses a three-dimensional volume 311, which surrounds the drill 302, and may also surround or extend to beyond the tip of the drill. The effect of the barrier 304a is to reduce transmission of sound from inside the volume 311—on this occasion the unprotected volume—to outside volume 311—on this occasion the protected volume—as the noisier environment is the volume containing the drill 302.

The invention therefore creates an acoustic bubble localized around the drill, which separates a user's head and particular his/her ears from the noise created by the drill. This reduces sound transmission from the drill and reduces the risk of damage to hearing. Further, this improves situational awareness and communication for the user and for surrounding people.

Although the invention has been described in relation to a drill, it could be used with other noisy equipment such as other electric hand tools, or an air-blown hand dryer.

Figure 4:
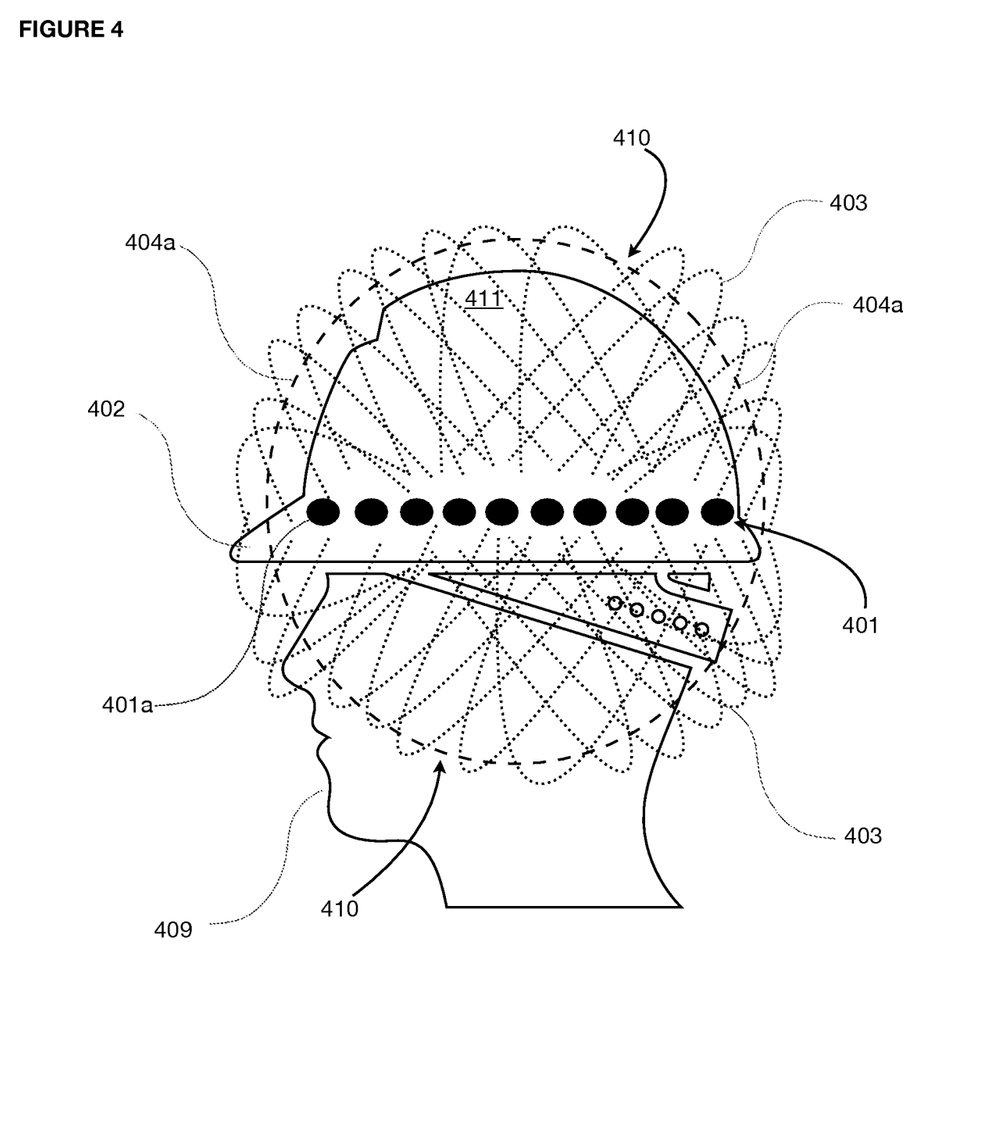
FIG. 4 is a graphical representation of an ultrasound array positioned on a helmet, which array generates a three-dimensional acoustic bubble around the helmet and/or at least part of a user's head.

FIG. 4 shows an ultrasound array 401, having a plurality of individual ultrasound emitters 401a, which is located on a helmet 402. The array 401 is circumferentially arranged around the helmet 402 to direct ultrasound outwardly from the helmet per se to a remote location 410, the boundary of which approximates to the shape of a spherical shell or spheroidal shell. Each emitter 401a is capable of providing an ultrasound output 403. Associated electronics including at least a processor, ultrasound output controller and power source are provided—not shown directly in FIG. 4—as part of the helmet 402. Accordingly, the apparatus of FIG. 4 operates in a similar way to the apparatus of FIG. 1, 2 or 3.

In use, each emitter 401a is individually controlled to control its timing, and ultrasound properties such as wavelength, amplitude, frequency, modulation and/or phase, and ultrasound 403 is directed to the remote location 410 where the ultrasound outputs 403 of a number of the plurality of emitters 401a combine to create an air-pressure barrier 404a of predetermined size, shape, depth and distance from the emitters 401a. The barrier 404a encloses a spherical volume 411, which surrounds the helmet 2 and/or at least part of a user's head 409. The effect of the barrier 404a is to reduce transmission of sound from outside the volume 411 (unprotected volume) to inside volume 411 (protected volume) to protect the user's hearing.

The array has been disclosed as being located on the helmet, and this could be achieved through either making the array integral with the helmet, or providing the array and its associated electronics as a separate apparatus which may be secured to a standard helmet, or even directly to a user's head in a similar manner to a head torch.

The effect of the acoustic bubble is to reduce sound exposure of the user's head 409 to external sound and, in this example, this acts as a protective helmet 402 to protect against loud sounds. This has utility in various sectors including the construction industry, military, and motor sports, or other noisy environments. In addition, the ultrasound array may be worn by a user to reduce external noise to enable undisturbed sleep and/or improve sound from earphones by reducing interference from external noise, or during hearing tests or assessments in any environment.

The ultrasound output 403 may commence at the onset of sound above a predefined amplitude and/or may be user controlled.

Figure 5:
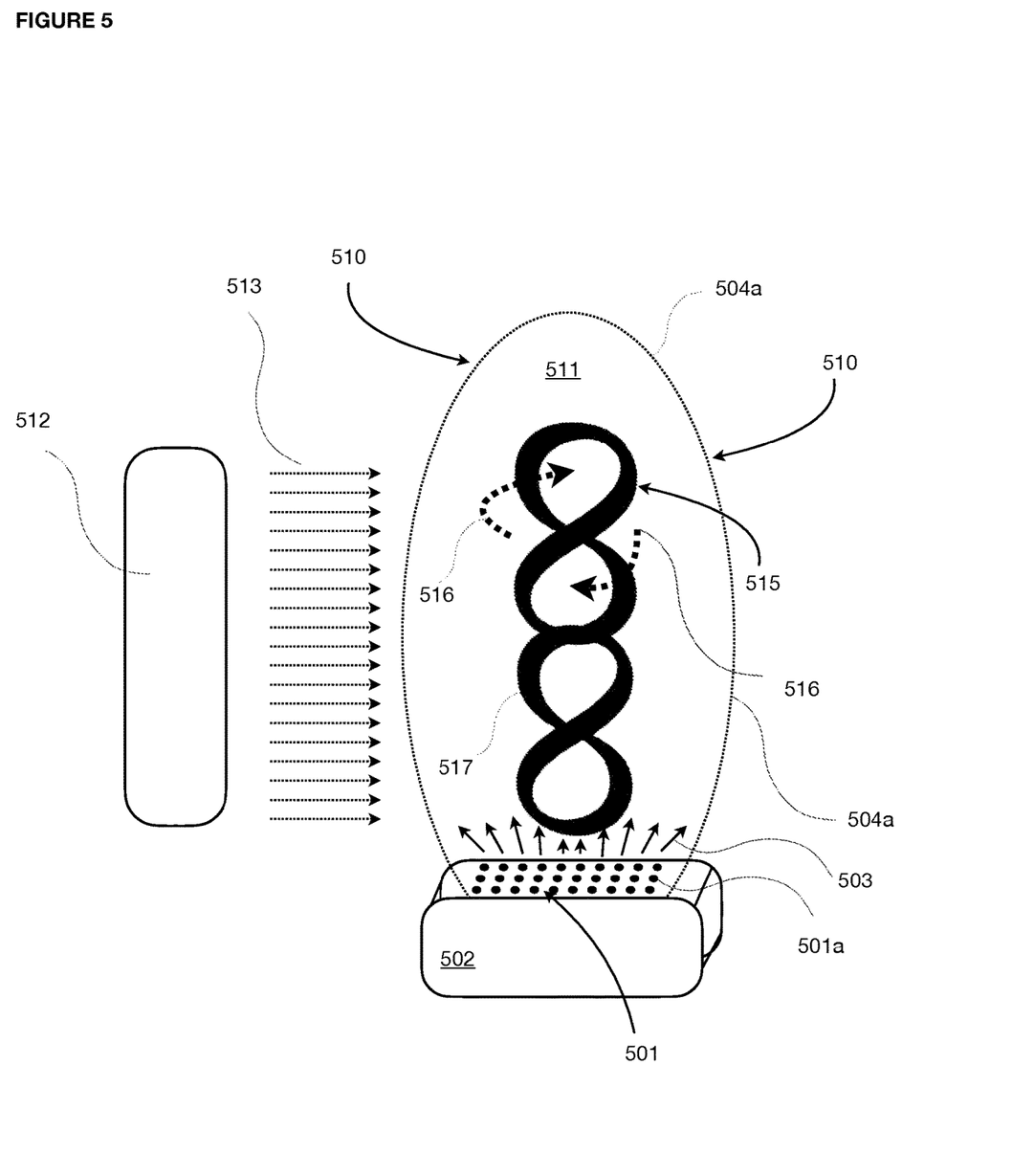
FIG. 5 is a graphical representation of an ultrasound array as part of a three-dimensional display apparatus.

FIG. 5 shows an ultrasound array 501, having a plurality of individual ultrasound emitters 501a, which is located on a top surface of a support structure 502 to direct ultrasound upwardly from the support structure to a remote location 510. Each emitter 501a is capable of providing an ultrasound output 503. Associated electronics including at least a processor, ultrasound output controller and power source are provided—not shown directly in FIG. 5—within the support structure 502. Accordingly, this aspect of the apparatus of FIG. 5 operates in a similar way to the apparatus of FIG. 1, 2, 3 or 4.

FIG. 5 also shows a helical screen 515, which is locatable in use within a volume 511 created by the outputs 503, where it is capable of being suspended and/or rotated. Further, a light source 512, having multiple emitters and/or a variable light output, is capable of providing illumination 513 and directing it towards the volume 511 and, thereby, the helical screen 515, which has a surface 517 for receipt of such illumination.

In use, each emitter 501a is individually controlled to control its timing, and ultrasound properties such as wavelength, amplitude, frequency, modulation and/or phase, and ultrasound 503 is directed to the remote location 510 where the ultrasound outputs 503 of a number of the plurality of emitters 501a combine to create an air-pressure barrier 504a equating in shape to spherocylindrical shell, of predetermined size, depth and distance from the emitters 501a. The barrier 504a encloses the volume 511 (making it a protected volume) which has the shape of a spherocylinder (or capsule). The effect of the barrier 504a is to reduce or prevent movement of air and/or the helical screen 515 from inside the volume 511 to outside thereof. In that sense, it acts as an acoustic trap, keeping the helical screen 515 within the volume 511. Once the barrier 504a is formed, one or more ultrasound emitters 501a are further individually controlled to control timing, and ultrasound properties such as wavelength, amplitude, frequency, modulation and/or phase, to cause the outputs to combine and, thereby, act upon the helical screen 515—either directly, indirectly by acting upon surrounding air or a combination of both—to suspend and rotate it, as exemplified by reference 516. As shown in FIG. 5, the axis of rotation is vertical; however, the axis of rotation could be in any plane.

Illumination 513 is directed at the helical screen 515 and illuminates one or more parts of the surface 517 when the position of the helical surface 517 is located at a position within the volume 511 corresponding to a relevant point in a three-dimensional image. Multiple emitters of light of the light source 512 illuminate parts of the helical screen 515 coinciding with times to cause emission of colours of light consistent with a three-dimensional image. As such, illumination 513 is caused to illuminate other parts of the surface 517 at the same time so as to provide a full three-dimensional image. A frequency of rotation of the helical screen is chosen to be greater than a frequency of frame rate appreciation by a human. In so doing, illumination 513 may be caused to illuminate one or more parts of the helical surface 517 in a defined sequence and over a period of time in order to create a moving three-dimensional image. So, rapid changing of the image enables a viewer to appreciate three-dimensional video or films.

By way of an alternative, the support structure 502 includes a blower (not shown) which provides air for suspending and/or rotating the helical screen 515 within the volume 511. In a further alternative, suspension and/or rotation of the helical screen 515 is provided by a combination of ultrasound and air from the blower. In other respects, the invention operates as described above.

Although the invention has been described in connection with a helical screen within the protected volume, the helical screen could be replaced by an agitated gas, preferably helically agitated, or a collection of particles or another object responsive to air pressure movement positioned and/or rotated within the protected volume.

Alternatively, images can be generated by illumination of the agitated gas, collection of particles or another object responsive to ultrasound pressure movement located in the acoustic bubble, such as vortices generated by variably interfering ultrasound waves Further, other particles may be contained and/or illuminated within the acoustic bubble including for aesthetic effects such as with lamps, or for demonstration purposes such as with three-dimensional representation of architectural designs, molecules, graphs or charts.

Those skilled in the art will realise that the shape of the protected volume and the shape of the barrier are not essential and disclosed above as examples only. The output of individual emitters may be adjusted to provide a protected volume of nearly any three-dimensional shape, subject to adequate geometric coverage of the emitters.

Figure 6:
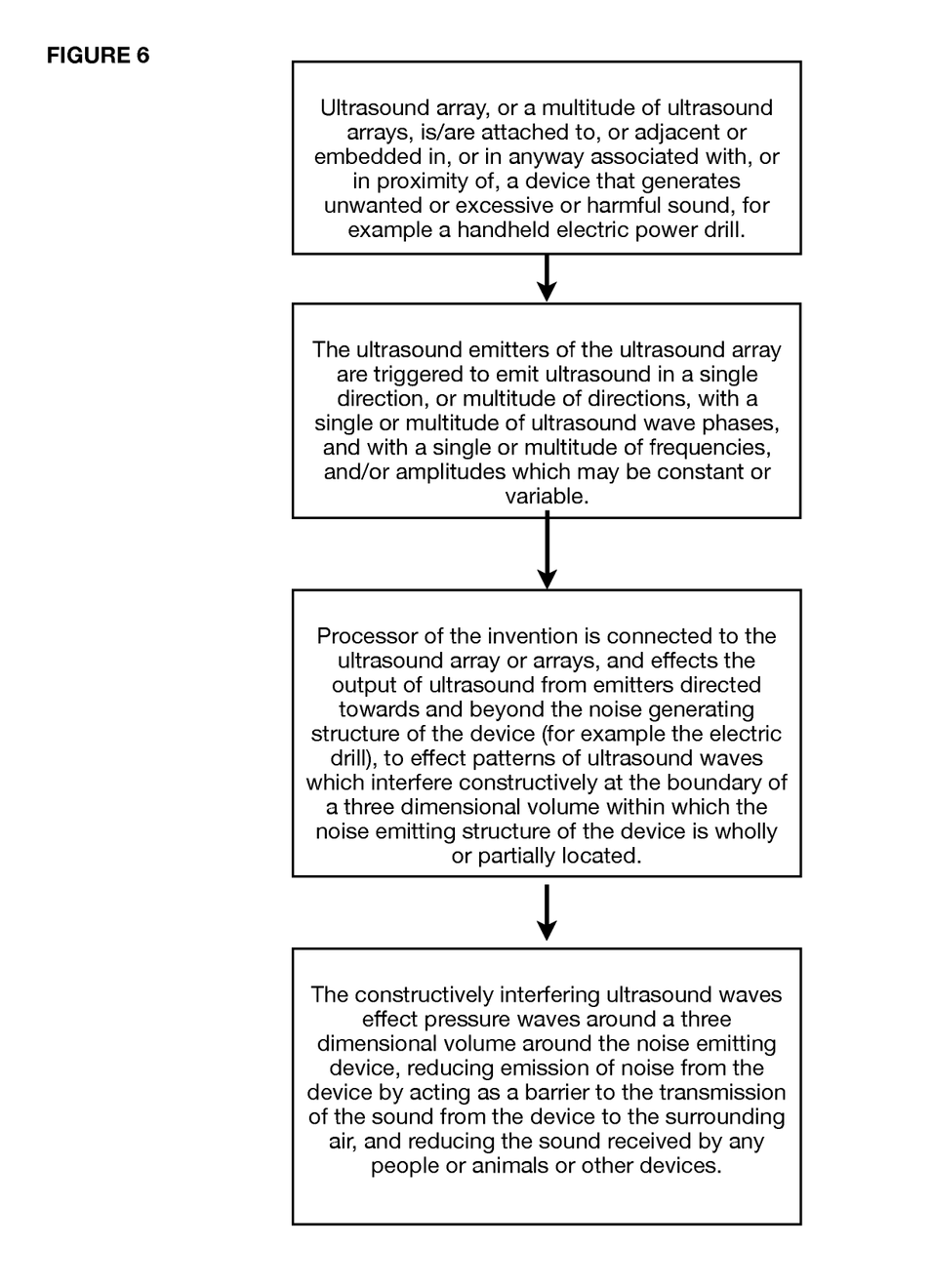
FIG. 6 is a flow chart further exemplifying use of an apparatus according to FIG. 3 to reduce sound exposure from an electric drill.

FIG. 6 is a flow chart exemplifying use of an apparatus according to FIG. 3 to reduce sound exposure from an electric drill, but also exemplifies use of ultrasound to suppress unwanted, excessive and/or harmful sound in other contexts.

The ultrasound array (301) is located as described above, although there could be a multitude of ultrasound arrays within, embedded, attached to, and/or adjacent the drill (302), so as to emit ultrasound (303) of different and/or varying characteristics. In a further alternative, the ultrasound array may be merely associated with or in proximity to the drill (302) rather than physically touching.

The ultrasound array (301) is controlled using a processor and ultrasound controller to emit ultrasound in a single direction, or multiple directions. Ultrasound (30) is emitted towards and beyond the noise generating object—the drill tip or drill (302). The ultrasound output of each individual emitter (301a) is controlled to provide individualised ultrasound of frequency, amplitude, modulation, phase and/or position such that the effect of combining the outputs of numerous emitters provides constructive interference at positions around a three-dimensional space or volume which partially or completely encloses the drill (302). Each ultrasound output may be of a single or a multitude of phase(s), having a single or multitude of frequencies and/or amplitudes, which may be constant or variable as required. Patterns of ultrasound waves which interfere constructively at the boundary of the volume are created, such that the volume wholly or partially encloses the drill (302)—or other noisy object.

The constructively interfering ultrasound waves provide pressure waves in the air surrounding the noisy object—drill (302)—reducing emission of noise by acting as a barrier to transmission of sound from the drill to air outside the volume, so as to reduce the level of noise or sound received by a user or animal located outside the volume.

The invention claimed is:

1. An apparatus for creating a segregated volume of air, the apparatus comprising a plurality of ultrasound emitters configured to provide interfering ultrasound outputs at a location remote from the ultrasound emitters,
wherein the interfering ultrasound outputs are configured to create a region of modified air pressure of predetermined size, shape and distance from the ultrasound emitters which acts as an air-pressure barrier capable of:
a) affecting transmission of sound across the air-pressure barrier; and/or
b) affecting movement of air, an airborne object, airborne particles or molecules, or an object responsive to movement by ultrasound, across the air-pressure barrier; and
c) creating, at a first boundary of the air-pressure barrier, a first volume of air and, at a second boundary of the air-pressure barrier, a second volume of air at least partially segregated from the first volume of air.

2. An apparatus as claimed in claim 1, wherein creating a protected volume at the first boundary and an unprotected volume at the second boundary.

3. An apparatus as claimed in claim 2, wherein the first volume or protected volume of air is localised around the plurality of ultrasound emitters.

4. An apparatus as claimed in claim 3, wherein the protected volume is an enclosed volume bounded at least partly by the air-pressure barrier.

5. An apparatus as claimed in claim 1 wherein the air-pressure barrier is:
a) a continual region of higher air pressure, lower air pressure, or standing waves; and/or
b) is an acoustic bubble intended to encapsulate an object, person or animal, or at least a part or combination thereof.

6. An apparatus as claimed in claim 1, wherein the interfering ultrasound outputs are configured to provide constructive interference or, alternatively, destructive interference.

7. An apparatus as claimed in claim 1, wherein outputs of individual ultrasound emitters are:
configurable to generate patterns of constructive or destructive interference waves;
spatially arranged and focusable at a desired location of the air-pressure barrier; and/or
configurable to modify characteristics of the air-pressure barrier comprising a size, depth, shape, or distance of the air-pressure barrier from the ultrasound emitters, and/or a strength of the air-pressure barrier.

8. An apparatus as claimed in claim 1, wherein outputs of individual ultrasound emitters are configurable to modify one or more characteristics of the air-pressure barrier comprising:
a transmission effect of the air-pressure barrier dependent upon the type(s) of sound that are desired to segregate using the air-pressure barrier;
a movement effect of the air-pressure barrier dependent upon the type(s) of airborne object, airborne particle(s) or molecule(s), or object responsive to movement by ultrasound, that are desired to segregate using the air-pressure barrier;
the transmission effect of the air-pressure barrier dependent upon sound detected in the first or protected volume and/or the second or un-protected volume; and/or
the transmission effect of the air-pressure barrier dependent upon an expected sound output and/or input.

9. An apparatus as claimed in claim 1, wherein outputs of individual ultrasound emitters are configurable to alter an individual timing, frequency, amplitude, direction, phase or modulation characteristics of the individual ultrasound output.

10. An apparatus as claimed in claim 1 wherein the air-pressure barrier is configured to:
prevent or reduce transmission of sound across the air-pressure barrier;
prevent or reduce movement of air, airborne particles or molecules, or objects responsive to movement by ultrasound, across the air-pressure barrier; and/or
provide selective audio pass-through, based upon detection of a preferred sound in one volume vis-à-vis the other volume.

11. An apparatus as claimed in claim 1, wherein one or more of the plurality of emitters is located in the first volume, second volume or in both first and second volumes of air, and are configured to provide interfering ultrasound outputs which act within one of the first or second volumes of air to interact with air, airborne particles or molecules, or object responsive to movement by ultrasound, to provide a movement or change in a position or state thereof within that volume.

12. An apparatus as claimed in claim 1, wherein the object responsive to movement by ultrasound, or airborne object, is a helical screen.

13. An apparatus as claimed in claim 12, wherein the apparatus comprises means for illuminating one or more parts of air, airborne particles or molecules, the helical screen or object responsive to movement by air or ultrasound at one or more predetermined locations to enable a viewer to see a three-dimensional image.

14. An apparatus as claimed in claim 13, wherein the apparatus is configured to illuminate at one or more predetermined locations and times, and alter the one or more predetermined location(s) in a defined sequence over a period of time so as to enable said viewer to see a film, three-dimensional video or moving holographic images.

15. A method for creating a segregated volume of air, the method comprising:
directing interfering ultrasound to a remote location and controlling the interfering ultrasound to create a region of modified air pressure of predetermined size and shape at that remote location which acts as an air-pressure barrier:
a) affecting transmission of sound across the air-pressure barrier; and/or
b) affecting movement of air, airborne object, airborne particles or molecules, or objects responsive to movement by ultrasound, across the air-pressure barrier, and
creating, at a first boundary of the air-pressure barrier, a first volume of air and, at a second boundary of the air-pressure barrier, a second volume of air at least partially segregated from the first volume of air.

16. A method as claimed in claim 15 comprising creating a protected volume at the first boundary and an unprotected volume at the second boundary.

17. A method as claimed in claim 16, wherein the first volume or protected volume of air is localised around a plurality of ultrasound emitters.

18. A method as claimed in claim 15 comprising:
a) creating a continual region of higher air pressure, lower air pressure or standing waves, in the air-pressure barrier; and/or
b) creating an acoustic bubble encapsulating an object, person or animal, or at least a part or combination thereof.

19. A method as claimed in claim 15 comprising directing and/or controlling the interfering ultrasound outputs to:
provide constructive or destructive interference;
generate patterns of constructive or destructive interference waves;
modify size, depth, shape, remote location, and/or strength characteristics of the air-pressure barrier;
modify a transmission effect of the air-pressure barrier dependent upon a type(s) of sound to segregate using the air-pressure barrier;
modify the movement effect of the air-pressure barrier dependent upon a type(s) of airborne object, airborne particle(s) or molecule(s), or object(s) responsive to movement by ultrasound, to segregate using the air-pressure barrier;
modify the transmission effect of the air-pressure barrier dependent upon sound detected in the first or protected volume and/or the second or un-protected volume; and/or
modify the transmission effect of the air-pressure barrier dependent upon an expected sound output and/or input.

20. A method as claimed in claim 15 comprising controlling individual ultrasound outputs to alter an individual timing, frequency, amplitude, direction, phase or modulation characteristics of the individual ultrasound output.

21. A method as claimed in claim 15, further comprising selective audio pass-through, based upon detection of a preferred sound in one volume vis-à-vis the other volume.

22. A method as claimed in claim 15 further comprising providing interfering ultrasound outputs which act within one of the first or second volumes of air to interact with air, airborne particles or molecules, or object responsive movement by ultrasound, to provide movement or change in a position or state thereof within that volume.

23. A method as claimed in claim 22 further comprising providing suspension and/or rotation of a helical screen.

24. A method as claimed in claim 23 further comprising illuminating one or more parts of air, airborne particles or molecules, the helical screen or object responsive to movement by ultrasound at one or more predetermined locations to enable a viewer to see a three-dimensional image.

25. A method as claimed in 24 further comprising illuminating at one or more predetermined locations and times, and altering the one or more predetermined locations in a defined sequence over a period of time so as to enable said viewer to see a film, three-dimensional video or moving holographic images.

* * * * *